(12) United States Patent
Takahashi

(10) Patent No.: US 7,059,534 B2
(45) Date of Patent: Jun. 13, 2006

(54) IC CARD

(75) Inventor: Hideki Takahashi, Tokyo (JP)

(73) Assignee: Konica Corporation, Tokyo (JP)

( * ) Notice: Subject to any disclaimer, the term of this patent is extended or adjusted under 35 U.S.C. 154(b) by 321 days.

(21) Appl. No.: 10/606,775

(22) Filed: Jun. 27, 2003

(65) Prior Publication Data

US 2004/0031855 A1  Feb. 19, 2004

(30) Foreign Application Priority Data

Jul. 2, 2002   (JP) ............................. 2002-193257

(51) Int. Cl.
*G06K 19/06* (2006.01)
(52) U.S. Cl. ...................................... 235/492; 257/679
(58) Field of Classification Search ................ 235/492, 235/491, 487; 902/26; 257/679; 361/737
See application file for complete search history.

(56) References Cited

U.S. PATENT DOCUMENTS

| | | | | |
|---|---|---|---|---|
| 5,673,179 A | * | 9/1997 | Horejs et al. .............. | 361/737 |
| 6,137,687 A | * | 10/2000 | Shirai et al. ................ | 235/492 |
| 6,160,526 A | * | 12/2000 | Hirai et al. ................. | 235/491 |
| 6,239,976 B1 | * | 5/2001 | Templeton et al. ......... | 361/737 |
| 6,291,877 B1 | * | 9/2001 | Usami et al. ............... | 257/679 |
| 6,422,473 B1 | * | 7/2002 | Ikefuji et al. ............... | 235/492 |
| 6,486,541 B1 | * | 11/2002 | Usami et al. ............... | 257/679 |
| 6,607,135 B1 | * | 8/2003 | Hirai et al. ................. | 235/487 |
| 2001/0055202 A1 | * | 12/2001 | Templeton et al. ......... | 361/761 |
| 2002/0027274 A1 | * | 3/2002 | Usami et al. ............... | 257/679 |

FOREIGN PATENT DOCUMENTS

GB        2 279 612 A   *   1/1995

\* cited by examiner

*Primary Examiner*—Jared J. Fureman
(74) *Attorney, Agent, or Firm*—Finnegan, Henderson, Farabow, Garrett & Dunner, L.L.P.

(57) ABSTRACT

An IC card, comprising: a first support; a second support; an IC module including and IC chip, a reinforcing structural member neighboring to the IC chip and an antenna; the IC module provided between the first and second supports; a first adhesive layer provided between the first support and the reinforcing structure member; and a second adhesive layer provided between the second support and the IC chip. When the IC card is curved with a radius R1 of curvature, the following formula is satisfied: $R1 < R1' < R2 \leq R3$, where R1' is a radius of curvature of an outermost layer of the IC card, R2 is a radius of curvature of the reinforcing structural member, and R3 is a radius of curvature of the IC chip.

20 Claims, 12 Drawing Sheets

IC CARD

BACKGROUND OF THE INVENTION

The present invention relates to a non-contact-type electronic card which records personal information requiring security with respect to prevention of such as forgery or alternation, or a personal certification card that is suitably applied to a sheet.

As an identification card (ID card) or a credit card, a magnetic card which records data by means of a conventional magnetic recording method has been commonly utilized. However, a magnetic card had problems of insufficient anti-tampering with data due to the ease of rewriting of the data, of insufficient protection of data due to environmental susceptibility of magnetic record and of insufficient memory capacity.

Therefore, an IC card including an IC-chip has become popular in recent years. An IC card exchanges data with external equipment by reading and writing, through an electric connection provided on the surface or a loop antenna in the card. An IC card is provided with larger memory capacity compared to a magnetic card and has been significantly improved also in security. Particularly, a noncontact-type IC card, which is provided with an antenna inside the card and without having an electric connection outside the card, is superior in security compared to a contact-type IC card which has an electric connection on the card surface, and has become to be utilized in such application as an IC card which highly requires secrecy and prevention of forgery or alternation.

As such an IC card, for example, there is known a card in which the first sheet material and the second sheet material are laminated sandwiching an adhesive and an IC module including an IC-chip and an antenna are sealed in the adhesive layer.

Since an IC card requires high security, durability of an IC card has become important in respect to prevention of forgery or alternation. Particularly, since an electric part such as an antenna for information exchange between an IC-chip and the outside are included inside the card, various attempts to assure durability thereof has been performed. However, in accordance with becoming popular in various applications, further high durability has been required. Owing to characteristics of a card that may be usually carried, strong durability is required against repeated bending such as in a pocket of trousers, dropping, or pressure by such as coins. To satisfy such requirements, improvement such as to provide a strong reinforcement structure in an IC-chip has been proposed.

However, although a limited improvement of durability was observed, there caused problems in that sufficient durability was not obtained in various situations, for example, in respect to such as durability against impact with rapid stress, repeated bending durability with repeated stress, and repeated localized load, resulting in a break of an IC-chip or a break of a card to make electric operation impossible.

The present invention has been made in view of these points, and the object is to provide an IC card having an improved bending strength and being able to protect an IC-chip.

To solve the above-described problems and to achieve the object, the invention has been constituted as follows.

The invention described in item 1 is an IC card, provided with a part including an IC module comprised of an IC-chip, a reinforcement structure adjacent to the IC-chip and an antenna at a predetermined position between two supports of the front-side and the backside facing to each other via an adhesive, characterized in that, when a radius of curvature R1 is applied to said IC card, a radius of curvature of an outermost layer of a card is R1', a reinforcement structure adjacent to said IC-chip and said IC-chip have radiuses of curvature of R2 and R3 respectively, and R1<R1'<R2.Itoreq.R3.

According to the invention described in item 1, it is possible to improve bending strength of an IC card and to protect an IC-chip, by defining a radius of curvature of each of an outermost layer of a card, a reinforcement structure and an IC-chip.

The invention described in item 2 is the IC card described in item 1, characterized in that D1/T1 is not less than 0.001 and not more than 0.05, wherein D1 is a thickness of an adhesive between said reinforcement structure and said front-side support and T1 is the maximum length of said reinforcement structure. It may be preferable that D1/T1 is 0.002 to 0.04.

According to the invention described in item 2, it is possible to improve bending strength of an IC card and to protect an IC-chip, by defining a relation between a thickness of an adhesive between a reinforcement structure and a front-side support and the maximum length of a reinforcement structure.

The invention described in item 3 is an IC card described in item 1, characterized in that said reinforcement structure is a metal reinforcement plate being adhered adjacent to said IC-chip, of which an area is larger than that of an IC-chip, and 0.02<tan .theta.<0.2, wherein .theta. is a degree between a plane, connecting the upper edge of a metal reinforcement plate and the upper edge of an IC-chip plane, and a horizontal plane of the metal reinforcement plate. It may be preferable that 0.03<tan .theta.<0.15.

According to the invention described in item 3, it is possible to improve bending strength of an IC card and to protect an IC-chip, by making 0.02<tan .theta.<0.2, wherein .theta. is a degree between a plane, connecting the upper edge of a metal reinforcement plate and the upper edge of an IC-chip plane, and a horizontal plane of the metal reinforcement plate.

The invention described in item 4 is an IC card described in item 1, characterized in that D2/T1 is not less than 0.001 and not more than 0.05, wherein D2 is a thickness of an adhesive between said IC-chip and said front-side support and T1 is the maximum length of said reinforcement structure. It may be preferable that D2/T1 is 0.002 to 0.04.

According to the invention described in item 4, it is possible to improve bending strength of an IC card and to protect an IC-chip, by defining the relation between a thickness of an adhesive between an IC-chip and a front-side support and the maximum length of a reinforcement structure.

The invention described in item 5 is an IC card described in any one of items 1 to 4, characterized in that a 2% modulus of elasticity of an adhesive adjacent to said IC-chip and said reinforcement structure is not less than 5 kg/mm.sup.2 and not more than 55 kg/mm.sup.2, and that a ductility at a breaking point is not less than 200% and not more than 1300%. It may be preferable that the 2% modulus of elasticity is 6 kg/mm.sup.2 to 50 kg/mm.sup.2. Further, it may be preferable that the reinforcing structural member has a Young's modulus of 150 Gpa to 450 Gpa.

According to the invention described in item 5, it is possible to improve bending strength of an IC card and to protect an IC-chip, by defining a 2% modulus of elasticity of an adhesive adjacent to an IC-chip and a reinforcement structure, and a ductility at a breaking point.

The invention described in item 6 is an IC card described in any one of items 1 to 4, characterized in that a thickness of said IC-chip is not less than 5 .mu.m and not more than 100 .mu.m.

According to the invention described in item 6, it is possible to improve bending strength of an IC card and to protect an IC-chip, by defining a thickness of an IC-chip.

The invention described in item 7 is an IC card described in any one of items 1 to 6, characterized in that an image receiving layer is provided on at least one of supports of the front-side and of the backside facing to each other, and that personal identification information comprised of a name and a face image is provided on the image receiving layer and a writable writing layer is provided on the other side.

According to the invention described in item 7, said IC card can be utilized as a personal certification card preferably applied in a non-contact type electronic card or sheet which has an image receiving layer and a writing layer and memorizes personal information requiring security such as prevention of forgery and alteration.

The invention described in item 8 is an IC card described in any one of items 1 to 7, characterized in that said adhesive is a reactive-type hot-melt adhesive.

According to the invention described in item 8, it is possible to relax stress and to obtain high durability due to an adhesive being a reactive-type hot-melt adhesive.

DETAILED DESCRIPTION OF THE PREFERRED EMBODIMENT

Figure 1:
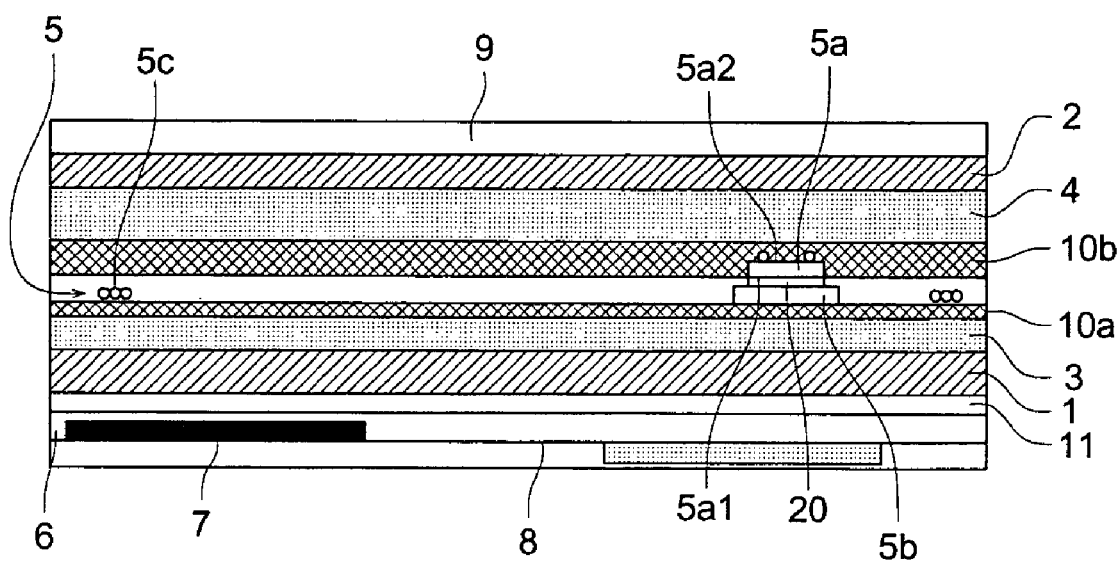
FIG. 1 shows a schematic layer configuration of an IC card.
Figure 2:
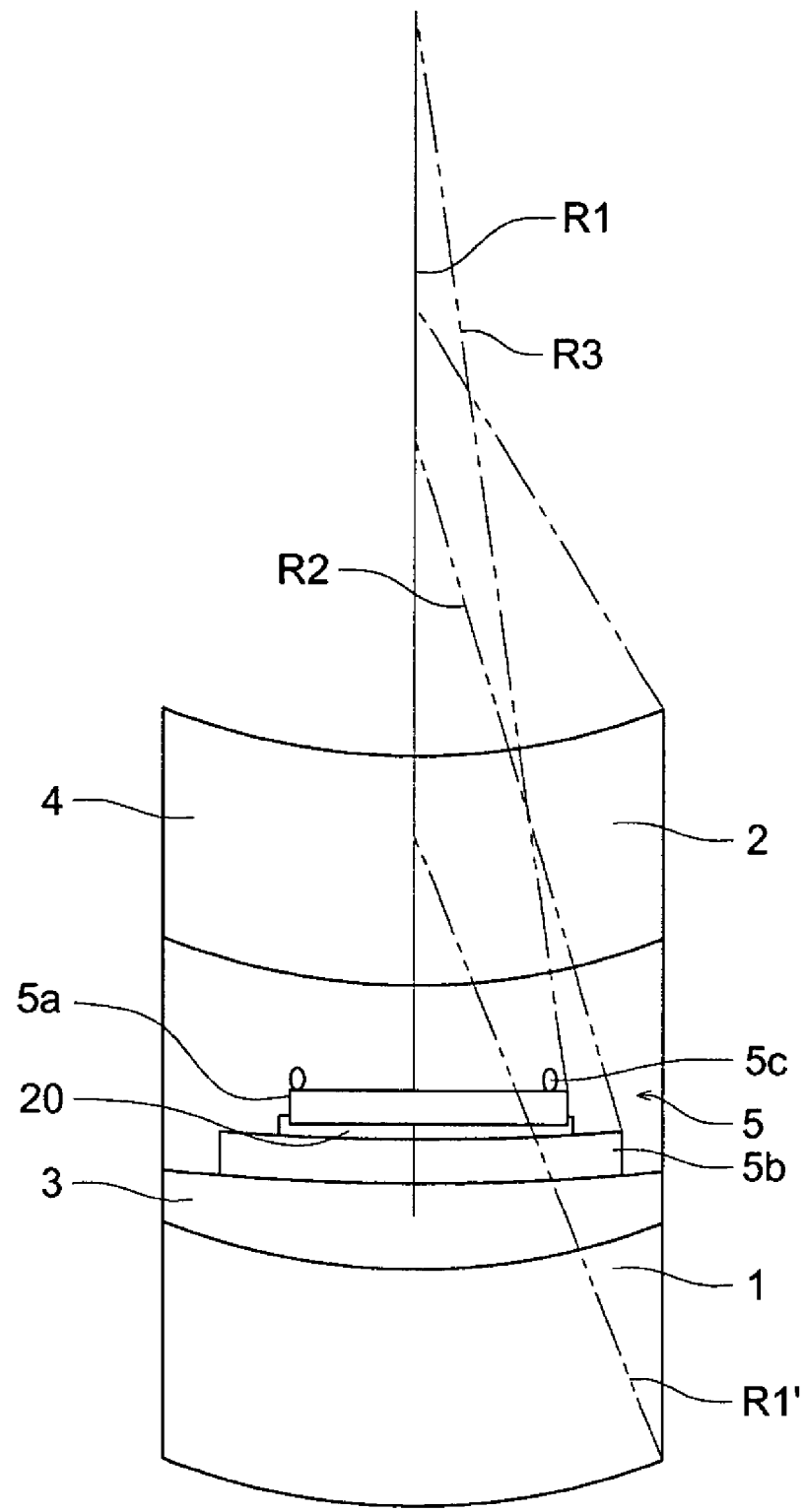
FIG. 2 is a drawing to explain a radius of curvature of an IC card.

In what follows, the embodiments of an IC card of the invention will be detailed according to drawings, however the invention is not limited to the embodiments. FIG. 1 is a drawing showing a brief layer configuration of an IC card, and FIG. 2 is a drawing showing a brief layer configuration in another embodiment of an IC card.

An IC card of the invention is provided with a part including IC module 5; comprised of IC-chip 5*a*, reinforcement structure 5*b* adjacent to IC-chip 5*a*, and antenna 5*c*; at a predetermined position between the two supports, a first support being a front-side and a second support being a backside, facing to each other, via adhesives 3 and 4. The part is provided with non-woven fabric 10*a* and 10*b* which sandwich IC module 5.

Reinforcement structure 5*b* is a metal reinforcement plate brought in cross contact with non-circuit surface 5*a1* of IC-chip 5*a* via adhesive 20, and antenna 5*c* is connected to circuit surface 5*a2* of IC-chip 5*a*. Adhesives 3 and 4 are preferably a reactive-type hot-melt adhesive.

Further, at least one of two supports 1 and 2 facing to each other, a first support 1 in this embodiment, provided with image receiving layer 6, and personal information 7 comprised of a name and a face image is provided on image receiving layer 6. Image receiving layer 6 is provided with protective layer 8. Further, the other second support 2 is provided with writable writing layer 9. Further, an IC card may be provided with cushion layer 11 between image receiving layer 6 and first support 1.

The invention is characterized in that, as shown in FIG. 2, when curvature R1 is applied to an IC card, an outermost layer of the card is R1', reinforcement structure 5*b* adjacent to IC-chip 5*a* and IC-chip 5*a* have radiuses of curvature of R2 and R3 respectively, and R1<R1'<R2.Itoreq.R3. An IC card is bent as shown in FIG. 2 when a radius of curvature is applied to an IC card, however, it is possible to improve a bending strength and to protect IC-chip 5*a* by defining each radius of curvature of an outermost layer of a card comprised of first support 1 and second support 2, of reinforcement structure 5*b* and of IC-chip 5*a*, to be R1<R1'<R2.Itoreq.R3.

Figure 3A:
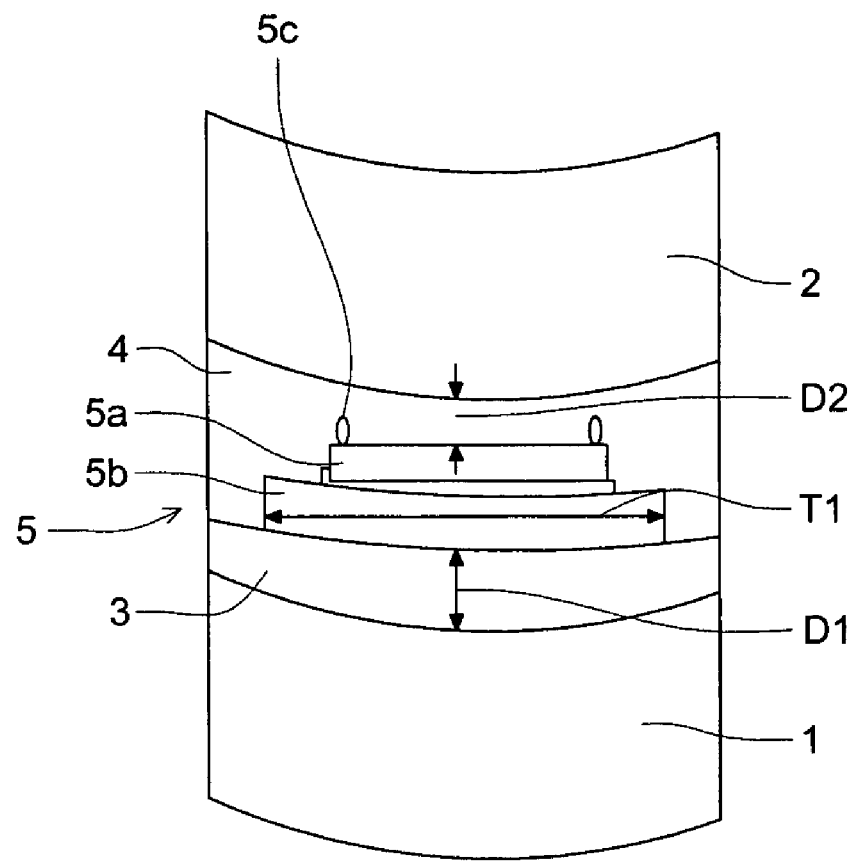
FIGS. 3(*a*) and 3(*b*) are drawings to explain the definition of a relationship between a thickness of a adhesive and the maximum length of a reinforcing structure.
Figure 3B:
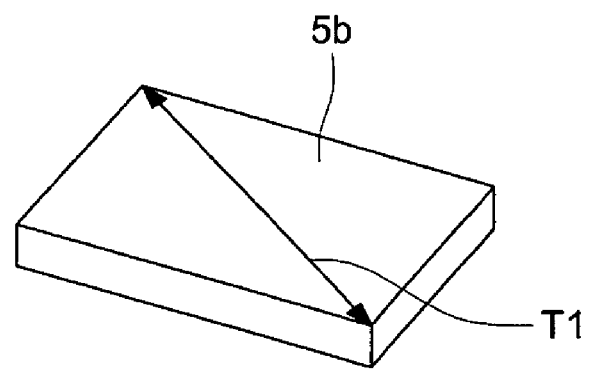

Further, the invention, as shown in FIG. 3(*a*) and FIG. 3(*b*), is characterized in that D1/T1 is not less than 0.001 and not more than 0.05, wherein D1 is a thickness of an adhesive between reinforcement structure 5*b* and front-side support 1 and T1 is the maximum length of reinforcement structure 5*b*. Reinforcement structure 5*b* is too large, when the relation between thickness of an adhesive between reinforcement structure 5*b* and front-side support 1 (D1) and the maximum length of reinforcement structure 5*b* (T1) is less than the defined value, while reinforcement structure 5*b* is too small when it is more than the defined value; by defining D1/T1 to be not less than 0.001 and not more than 0.05, reinforcement structure 5*b* has a suitable size and it is possible to improve bending strength and to protect IC-chip 5*a*.

Figure 4:
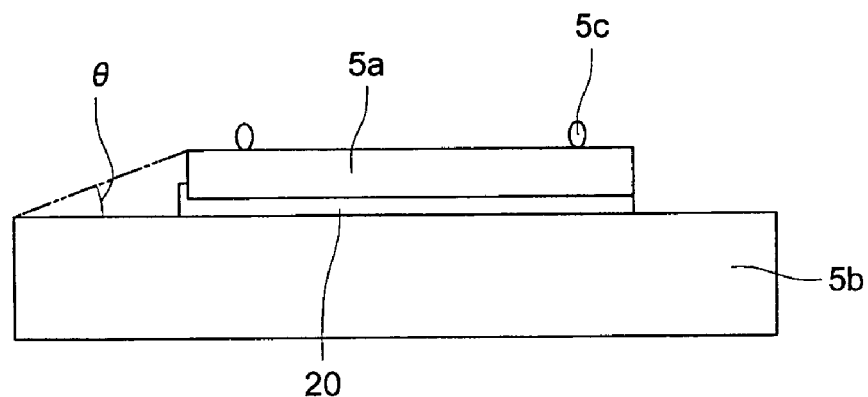
FIG. 4 is a drawing to explain the definition of an angle connecting a metal reinforcing plate and an upper edge of an IC chip.
Figure 5:
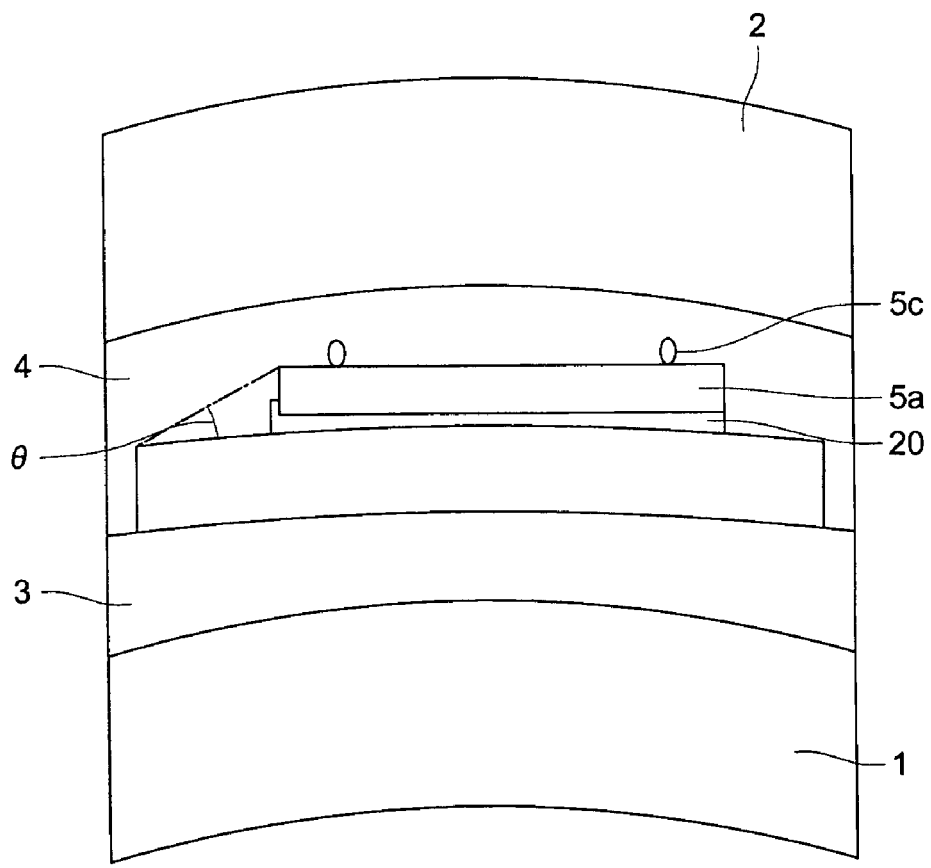
FIG. 5 is a drawing to explain the definition of an angle connecting a metal reinforcing plate of an IC card and an upper edge of an IC chip.

Further, reinforcement structure 5*b*, as shown in FIGS. 4 and 5, is a metal reinforcement plate being adhered adjacent to IC-chip 5*a*, of which an area is larger than that of an IC-chip, and 0.02<tan .theta.<0.2, wherein .theta. is a degree between a plane, connecting the upper edge of the metal reinforcement plate with the upper edge of an IC-chip plane, and a horizontal plane of a metal reinforcement plate.

Reinforcement structure 5*b* has a suitable size and it is possible to improve a bending strength of an IC card and to protect IC-chip 5*a* by making a constitution of reinforcement structure 5*b* of a metal reinforcement plate and setting 0.02<tan .theta.<0.2, wherein .theta. is a degree formed by the metal reinforcement plate and a plane connecting to the upper edge of an IC-chip plane.

Figure 6:
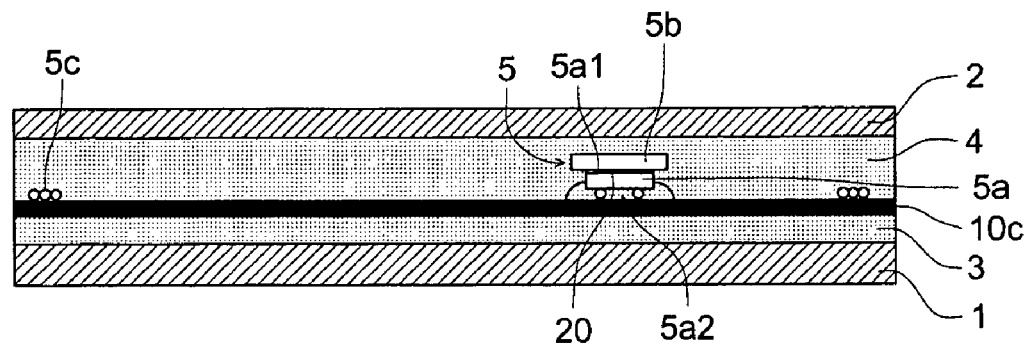
FIG. 6 shows a schematic layer configuration of an another IC card.
Figure 7:
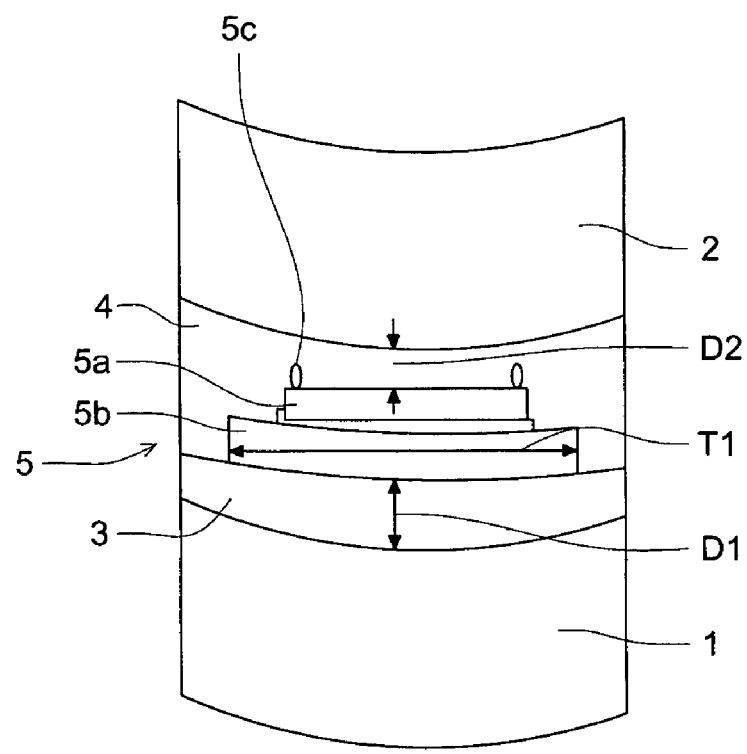
FIG. 7 is a drawing to explain the definition of a relationship between a thickness of a adhesive and the maximum length of a reinforcing structure.

Further, in the invention, as shown in FIGS. 6 and 7, IC module 5, which is comprised of IC-chip 5a, reinforcement structure 5b adjacent to IC-chip 5a, and antenna 5c, is provided on PET sheet 10c, and D2/T1 is not less than 0.001 and not more than 0.05, wherein D2 is a thickness of an adhesive between IC-chip 5a and the back-side support 2, and T1 is the maximum length of reinforcement structure 5b. Reinforcement structure 5b is too large when the relation, between thickness of an adhesive between said IC-chip 5a and back-side support 2 (D2), and the maximum length of reinforcement structure 5b (T1), is less than the defined value, while reinforcement structure 5b is too small when it is more than the defined value; by defining D2/T1 to be not less than 0.001 and not more than 0.05, reinforcement structure 5b has a suitable size and it is possible to improve bending strength and to protect IC-chip 5a.

Further, in the invention, a 2% modulus of elasticity of an adhesive adjacent to IC-chip 5a and reinforcement structure 5b is not less than 5 kg/mm.sup.2 and not more than 55 kg/mm.sup.2, a ductility at a breaking point is not less than 200% and not more than 1300%; it is possible to disperse external stress loaded on an IC-chip to improve bending strength of an IC card and to protect an IC-chip, by defining a 2% modulus of elasticity and a ductility at a breaking point of an adhesive. Further, thickness of IC-chip 5a is preferably not less than 5 .mu.m and not more than 100 .mu.m.

Further, an IC card is provided with image receiving layer 6 and writing layer 9, and can be suitably utilized as a personal certification card by being applied to a non-contact type electronic card or sheet memorizing such as personal information which requires security such as prevention of forgery and alteration.

Further, it is possible to relax stress and to obtain high durability by utilizing a reactive type hot-melt adhesive as adhesives 3 and 4.

In what follows, a configuration of an IC card of the invention will be detailed.

<Support>

Examples of a support include single-layered sheets comprised of synthetic resin sheets of such as polyester resins such as polyethylene terephthalate, polybutylene terephthalate, and a polyethylene terephthalate/isophthalate copolymer; polyolefin resins such as polyethylene, polypropylene and polymethyl pentene; polyethylene fluoride type resins such as polyvinyl fluoride, polyvinylidene fluoride, polyethylene tetrafluoride and an ethylene/tetrafluoroethylene copolymer; polyamides such as 6-nylon, 6,6-nylon; vinyl polymers such as polyvinyl chloride, a vinyl chloride/vinyl acetate copolymer, an ethylene/vinyl acetate copolymer, an ethylene/vinyl alcohol copolymer, polyvinyl alcohol, vinylon; biodegradable resins such as biodegradable aliphatic polyester, biodegradable polycarbonate, biodegradable polylactic acid, biodegradable polyvinyl alcohol, biodegradable cellulose acetate and biodegradable polycaprolactone; cellulose-type resins such as cellulose triacetate and cellophane; acryl-type resins such as polymethyl methacrylate, polyethyl methacrylate, polyethyl acrylate and polybutyl acrylate; polystyrene; polycarbonate; polyallylate and polyimide; or of paper such as wood free paper, thin leaf paper, grassine paper and sulfuric acid paper; and of metal foil; or multi-layered sheets in which two or more sheets thereof are accumulated.

The thickness of a support of the invention is from 30 to 300 .mu.m and preferably from 50 to 200 .mu.m. In case of more than 50 .mu.m, it may be preferable that there may be no thermal shrinkage at the time of laminating the first and the second supports together. In the invention, a coefficient of thermal shrinkage is preferably not more than 1.2% in a longitudinal direction (MD) and not more than 0.5% in a width direction (TD) at 150.degree. C./30 min.

Since it was difficult to register in the following cutting process and printing process due to thermal shrinkage having been caused by temperature in case that an adhesive was coated or laminated for production from both surface sides of the first support and the second support, it is preferred to caused no shrinkage of the supports by utilizing an adhesive, which adheres at low temperatures, and a support, having a coefficient of thermal shrinkage of not more than 1.2% in a longitudinal direction (MD) and not more than 0.5% in a width direction (TD) at 150.degree. C./30 min.

In the invention, preferably utilized is a support, which is prepared by blending with a white pigment to improve opacity and by being annealed to depress a thermal shrinkage percentage, having a thermal shrinkage percentage of not more than 1.2% in a longitudinal direction (MD) and not more than 0.5% in a width direction (TD) at 150.degree. C./30 min. The above-described after processes were proved to become difficult due to shrinkage of a support when a thermal shrinkage percentage is not less than 1.2% in a longitudinal direction (MD) and not less than 0.5% in a width direction (TD). Further, on the above-described support, adhesion enhancing treatment for improving adhesion in the post process or anti-static treatment for chip protection may have been provided.

Concretely, U2 Series, U4 Series and UL Series manufactured by Teijin Dupont Film Co., Ltd.; Clisper G Series manufactured by Toyobo Co., Ltd.; and E00 Series, E20 Series, E22 Series, X20 series, X40 Series, E60 Series and QE Series manufactured by Toray Industries, Inc. can be suitably utilized.

The second support may be optionally provided with an image receiving layer and a cushion layer to form a face image of the card user. An image element is provided on the surface of a personal certification card base, and preferably includes at least one selected from a certifying identification image such as a face image, an attributing information image and format print.

<Image Receiving Layer>

For an image receiving layer, resins well known in the art can be utilized and examples include polyvinyl chloride resins, copolymer resins of vinyl chloride and other monomers (such as isobutylether and vinylpropionate), polyester resins, poly(metha)acrylate esters, polyvinylpyrrolidone, polyvinylacetal-type resins, polyvinylbutyral-type resins, polyvinylalcohol, polycarbonate, cellulose triacetate, polystyrene, copolymers of styrene and other monomer (such as acrylate ester, acrylonitrile and ehtylene chloride), vinyltolueneacrylate resins, polyurethane resins, polyamide resins, urea resins, epoxy resins, phenoxy resins, polycaprolactone resins, polyacrylonitrile resins and modified compounds thereof, and preferable are polyvinyl chloride resins, copolymers of vinyl chloride and other monomers, polyester resins, polyvinylacetal-type resins, polyvinylbutyral-type resins, copolymers of styrene and other monomers and epoxy resins.

<Cushion Layer>

Polyolefin is preferable as a material to form a cushion layer of the invention. For example, such as polyethylene, polypropyrene, an ethylene-vinyl acetate copolymer, an ethylene-ethylacrylate copolymer, a styrene-butadiene-styrene block-copolymer, a styrene-isoprene-styrene block-copolymer, a styrene-ethylene-butadiene-styrene block-copolymer, a styrene-hydrogenated isoprene-styrene block-copolymer, polybutadiene and a photo-curable resin; having flexibility and a low thermal conductivity are suitable. Concretely a cushion layer such as described in Japanese Patent Application No. 2001-16934 can be utilized.

A cushion layer referred in the invention means a soft resin layer, which is located between a support and an image receiving layer accepting an image, and functions to relax the effect of roughness caused by an electronic part such as an IC module.

The cushion layer is not particularly limited provided that it is of an embodiment locating a cushion layer between an image receiving layer and an electronic part, however, is specifically preferably formed being coated or laminated on one or both of the surfaces of a support.

<Writing Layer>

A writing layer is a layer which is made to be writable on the back-side of an IC card. Such a writing layer can be formed, for example, by including inorganic fine particles of such as calcium carbonate, talc, diatomaceous earth, titanium oxide and barium sulfate in a film of a thermoplastic resin (e.g. a polyolefin series such as polyethylene, and various kinds of copolymers). It can be formed according to "a write-in layer" described in JP-A (Hereinafter, JP-A refers to Japanese Patent Publication Open to Public Inspection) No. 1-205155. The above-described writing layer is formed on the surface, on which plural layers are not accumulated, of a support.

<Adhesive>

As a hot-melt adhesive for an IC card of the invention, ones commonly used can be uttilized. A main component of a hot-melt adhesive includes, for example, an ethylene-vinylacetate copolymer (EVA) type, a polyester type, a polyamide type, a thermoplastic elastomer type, a polyolefin type, etc. However, in the invention, a card is liable to curl or a layer such as an image receiving layer for image formation by means of thermal transfer, being provided on a card surface and weak in a high temperature process, may be damaged. Further, when being laminated via adhesive, the base materials are preferably laminated at not higher than 80.degree. C., more preferably from 10 to 80.degree. C. and furthermore preferably from 20 to 80.degree. C., in respect to problems in that base materials cause thermal shrinkage due to a high temperature lamination, resulting in poor dimensional and positional precision at the time of lamination. Among low temperature hot-melt adhesives, concretely, a reactive type hot-melt adhesive is preferable. As a reactive hot-melt adhesive, materials of a moisture curable type are disclosed in JP-A Nos. 2000-036026, 2000-219855, 2000-211278 and 2000-219855, and Japanese Patent Application No. 2000-369855. Photo-curable adhesives are disclosed in JP-A Nos. 10-316959 and 11-5964.

Any of these adhesive may be used, and unlimited materials are preferably utilized in the invention. A layer thickness of an adhesive, provided being in a range of the invention, is preferably from 10 to 600 .mu.m, more preferably from 10 to 500 .mu.m and furthermore preferably from 10 to 450 .mu.m, based on a thickness including the electronic part. In the invention, by utilizing an adhesive having a low module of elasticity of such as in a range from 5 to 55 kg/mm.sup.2, it is possible to relax stress and to obtain excellent durability.

<Electronic Part (IC Module)>

An electronic part indicates an information recording member and concretely an IC module comprised of an IC-chip, which electrically records information of an electronic card user, and a coil-shaped antenna element connected thereto. An IC-chip is comprised of only a memory or of a microcomputer in addition thereto. Optionally, an electronic part may also include a condenser.

The invention is not limited thereto, and an electronic part is not particularly limited provided that it is necessary for an information recording member. An IC module is provided with an antenna; in case of being provided with an antenna pattern, it may be prepared by any method such as an electric-conductive paste printing process, a copper foil etching process and a wire welding process.

As a printed board, a thermoplastic film such as polyester is utilized, and polyimide is advantageously used in case of high thermal-resistance being required. The bonding of an antenna pattern with an IC-chip is performed by any method commonly known such as a method utilizing electrical-conductive adhesives such as silver paste, copper paste, carbon paste, etc. (for example, EN-4000 Series manufactured by Hitachi Chemical Co., Ltd. and XAP Series manufactured by Toshiba Chemical Corp.); a method utilizing anisotropic electrical-conductive film (such as Anisolm manufactured by Hitachi Chemical Co., Ltd.); and a method applying solder bonding.

To avoid poor stability, such as disconnecting at bonding portions due to shear stress by adhesive flow, and damaging smoothness of the surface due to flow or cooling of an adhesive, caused by filling an adhesive layer resin after a part including an IC-chip is mounted on a predetermined position in advance, a part, to be enclosed in the adhesive layer on a board sheet in advance, is preferably prepared in a form of a porous resin film, a porous foaming resin film, a flexible resin sheet, a porous resin sheet or a non-woven fabric sheet. For example, a method described in Japanese Patent Application No.11-105476 can be utilized.

For example, a non-woven fabric sheet member includes mesh-form fabric made of non-woven fabric, fabric of plain weave, twilled weave and satin weave. Further, fabric having piles called such as mocket, plushbelour, seal, velvet and suede can be utilized. Materials include fiber of combinations of one or not less than two kinds selected from synthetic resins of a polyamide type such as type 6-nylon, 66-nylon and 8-nylon, a polyester type such as polyethylene terephthalate, a polyolefin type such as polyethylene, polyvinyl alcohol, a polyvinilidene chloride type, a polyvinyl chloride type, an acryl type such as polyacrylonitrile, acrylamide and methacrylamide, a polyvinylidene cyanate type, a polyfluoroethylene type and polyurethane type; natural fibers such as silk, cotton, wool, a cellulose type and a cellulose ester type; regenerated fiber (rayon and actate) and aramide fiber.

Among these fabric materials preferable are a polyamide type such as 6-nylon and 66-nylon, an acryl type such as polyacrylnitrile, acrylamide and methacrylamide, a polyester type such as polyethylene terephthalate, a cellulose type as a regenerated fiber, a cellulose ester type such as rayon and acetate and aramide fiber. Since an I IC-chip is weak in strength against point pressure, a metal reinforcement plate as a reinforcement structure is preferably provided in the neighborhood of an IC-chip. The total thickness of an electronic part is preferably from 10 to 300 .mu.m, more preferably from 30 to 300 .mu.m and furthermore preferably from 30 to 250 .mu.m.

<Method to Provide Electronic Part Having Prescribed Thickness Between First Support and Second Support>

As a manufacturing method to provide a predetermined electronic part between the first support and the second support of the invention, a thermal lamination method, an adhesive lamination method and an injection molding method are well known and any of the methods can be utilized. Format printing or information recording may be performed before or after the first support and the second support being laminated, and it can be formed by any method such as off-set printing, gravure printing, silk printing, screen printing, intaglio printing, letterpress printing, an ink jet method, a sublimation transfer method, an electrophotographic method and a thermal fusion method.

A manufacturing method of an IC card of the invention is comprised of at least a process in which an adhesive member, being in a state of solid or viscous body at ordinary temperature and softened in a heated state, is provided on a support for an IC card, a process in which an electronic part is arranged on the support, a process in which a support for the front surface provided with an adhesive member is arranged so as to cover the electronic part on the support, and a process in which a support, an electronic part and a support for the front surface are laminated together; and lamination is preferably performed.

The adhesive member being a solid body or a viscous body and softened in a heated state is preferably prepared by a method in which an adhesive itself is formed in a sheet-form, or by a method in which an adhesive itself is melt by heat or at ordinary temperature and laminated by means of an injection molding method.

Temperature of enabling to adhere an electronic part predetermined between the first support and the second support is preferably not higher than 80.degree. C., more preferably from 0 to 80.degree. C. and furthermore preferably from 20 to 70.degree. C. A cooling process is preferably provided after the lamination to reduce such as warp of a support. Cooling temperature is preferably not higher than 70.degree. C., more preferably from −10 to 70.degree. C. and furthermore preferably from 10 to 60.degree. C.

At the time of lamination, to enhance smoothness of a base surface and adhesion property of an electronic part predetermined between the first support and the second support, they are preferably subjected to heating and pressing, and preferably manufactured by such as an up-and-downward pressing and lamination method. Further, it is preferred to avoid utilizing rolls which provides nearly linear contact and unreasonable bending force with even a slight shift, and to adopt a planer-press type, taking cracking of IC-parts into consideration. The heating is preferably performed at from 10 to 120.degree. C. and more preferably from 30 to 1000° C. The press is preferably performed at from 0.1 to 300 kgf/cm.sup.2 and more preferably at from 0.1 to 100 kgf/cm.sup.2. When the pressure is higher than this, an IC-chip may be collapsed. The time for heating and pressing is preferably from 0.1 to 180 sec. and more preferably from 0.1 to 120 sec.

In an IC card of the invention, an adhesive is preferably provided directly on an IC-chip. This relaxes stress applied on an IC-chip and improves durability.

A laminated sheet or a continuously coated lamination roll, prepared as a continuous sheet by an adhesive-lamination method or a resin injection method described above, may be recorded with certifying identification images and bibliographic items after being allowed to stand for a time equal to a predetermined curing time of an adhesive; thereafter, may be shaped into a prescribed card size. As methods for shaping into a prescribed card size, such as a stamping method and a cutting method are mainly selected.

<General Description on Image Forming Method of Image Recording Element>

An image recording element of an IC card according to the invention is provided with an image element of at least one selected from a certifying identification image such as a face image, an attribute information image and a format printing is formed on a an image or printing surface side of a substrate. A face image is generally a full-colored image having tone, and is prepared, for example, by a sublimation thermal transfer recording method or a silver halide color photographic method. A letter information image, comprises a binary image, and is formed, for example, by such as a fusion thermal transfer recording method, a sublimation thermal transfer recording method, a silver halide color photographic method, electrophotographic method, or an ink-jet method.

In the invention, it is preferable to record a certifying identification image such as a face image and an attribute information image by a sublimation thermal transfer recording method. Attribute information include a name, an address, a birth date, a license, etc., and are recorded, usually as letter information, generally by means of a fusion thermal transfer recording method. A format printing or information recording may also be performed, and this can be formed by any method such as offset printing, gravure printing, silk printing, screen printing, intaglio printing, letterpress printing, an ink-jet method, a sublimation transfer method, an electrophotographic method and a thermal fusion method.

Further, for the purpose of preventing forgery and alternation, an optical variable device described below such as a hologram and a fine structure tint may be adopted. A layer to prevent forgery and alternation is optionally selected from a printed matter, a hologram, a bar cord, a matte pattern, a fine structure tint, a ground tint and a roughened pattern, and is comprised of a visible light absorbing colorant, a UV absorbent, an infrared absorbent, a fluorescent brightener, a metal evaporated layer, a glass evaporated layer, a bead layer, an optical variable element layer, a pearl ink layer and a scaly pigment layer.

An ink sheet for sublimation thermal transfer recording of a sublimation image forming method can be composed of a support and an ink layer formed thereon containing sublimation dyes.

Support

As a support, there is no specific limitation, and those well known in the art, provided being superior in dimensional stability and resistant against heat at the time of recording with a thermal head, can be utilized.

Sublimation Dye Containing Ink Layer

The sublimation dye containing ink layer described above basically contains a sublimation dye and a binder. The above-described sublimation dye includes cyan dyes, magenta dyes and yellow dyes. The cyan dyes include naphthoquinone type dyes, anthraquinone type dyes and azomethine type dyes described in such as JP-A Nos. 59-78896, 59-227948, 60-24966, 60-53563, 60-130735, 60-131292, 60-239289, 61-19396, 6122993, 61-31292, 61-31467, 61-35994, 61-49893, 61-148269, 62191191, 63-91288, 63-91287 and 63-290793.

The magenta dyes include anthraquinone type dyes, azo type dyes and azomethine type dyes described in such as JP-A Nos. 59-78896, 60-30392, 60-30394, 60-253595, 61-262190, 635992, 63-205288, 64-159 and 64-63194. The yellow dyes include methine type dyes, azo type dyes, quinophthalone type dyes and anthraisothiazole type dyes described in such as JP-A Nos. 59-78896, 60-27594, 60-31560, 60-53565, 61-12394 and 63-122594.

Specifically preferable sublimation dyes are azomethine dyes obtained by coupling reaction of compounds having a closed-chain type or open-chain type active methylene group, with oxidants of p-phenylenediamine derivatives or those of p-aminophenol derivatives; and indoaniline dyes obtained by coupling reaction of phenol or naphthol derivatives with oxidants of p-phenylenediamine derivatives or those of p-aminophenol derivatives.

Further, when a metal ion containing compound is included in an image receiving layer, it is preferable to include a sublimation dye that forms a chelate upon reaction with the metal ion containing compound, in a sublimation dye including ink layer. Examples of the chelate forming sublimation dyes include cyan dyes, magenta dyes and yellow dyes, forming a chelate of at least bidentate, described in JP-A Nos. 59-78893 and 59-109349, Japanese Patent Application Nos. 2-213303, 2-214719 and 2-203742. Preferable sublimation dyes capable of forming a chelate can be represented by the following general formula:

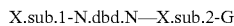

X.sub.1-N.dbd.N—X.sub.2-G where, X.sub.1 represents an aromatic carbon ring, in which at least one ring is composed of 5 to 7 atoms, or an atomic group necessary to complete a heterocyclic ring, provided that at least one of the adjacent positions to carbon atoms which bond to the azo bond is a carbon atom substituted by a nitrogen atom or a chelating group; X.sub.2 represents an heterocyclic ring, in which at least one ring is composed of 5 to 7 atoms, or an aromatic carbon ring; and G represents a chelating group.

Any sublimation dyes contained in the sublimation dye containing ink layer above described, may be any of a yellow dye, a magenta dye and a cyan dye when an image to be formed is monocolor, and any two or more dyes out of three dyes above described or other sublimation dyes may be contained depending on the color of an image to be formed. The using amount of sublimation dyes described above generally from 0.1 to 20 g and preferably 0.2 to 5 g, based on 1 m.sup.2 of a support. A binder for an ink layer is not specifically limited, and those well known in the art can be used. Further, in the aforementioned ink layer, various kinds of additives well known in the art can be suitably added. An ink sheet for sublimation thermal transfer recording can be prepared in such a manner that ink layer coating solution, which has been prepared by dispersing or solving various ink layer components described above, is coated on a support and then dried. The thickness of thus prepared ink layer is generally from 0.2 to 10 .mu.m and preferably from 0.3 to 3 .mu.m.

<Measurement Method of Ductility at Breaking Point and 2% Modulus of Elasticity>

An adhesive sheet having a thickness after curing of 500 .mu.m is prepared, and a tensile modulus of elasticity and a tensile ductility at a breaking point of the adhesive sheet were measured according to ASTM D638 by use of Tensilon Universal Tester RTA-100 produced by Orientech Co., Ltd.

EXAMPLES

In what follows, the invention will be detailed in reference to examples, however, the embodiment of the invention is not limited thereto. Herein, "parts" below indicates "parts by weight".

<Preparation of Adhesive>

Adhesive 1;

Macroplast QR 3460 (a moisture-curable type adhesive) manufactured by Henkel Co. was utilized.

<Preparation of IC Module>

IC Module 1;

The first reinforcement plate having a thickness of 120 .mu.m and 4.times.4 mm square shape, made of SUS 301, was adhered with an epoxy-type resin onto the side opposite to a circuit plane of an IC-chip of 50 .mu.m thick and 3.times.3 mm square, and a winding-wire type antenna was formed to be connected to a bump formed on an IC-chip. Successively, an IC module was sandwiched from both sides by non-woven sheets made of polyethylene terephthalate fiber to prepare IC module 1.

Figure 8:
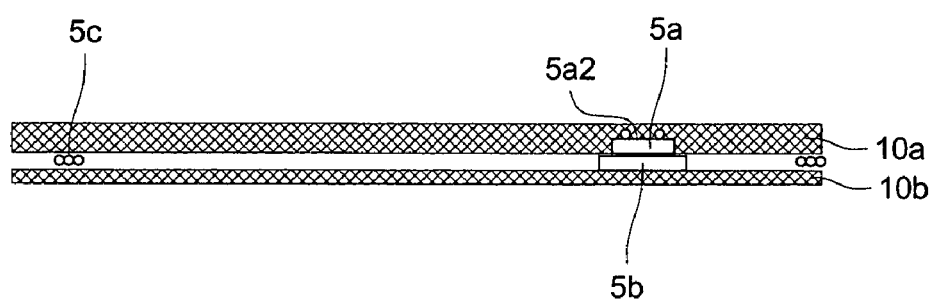
FIG. 8 shows a configuration of an IC module.

When the maximum degree between a plane, connecting the upper edge of an IC-chip plane and the upper edge of a reinforcement plate plane, and a reinforcement plate plane was .theta., tan .theta. was 0.11. The module is shown in FIG. 8.

IC module 2;

The first reinforcement plate having a thickness of 120 .mu.m and 5.times.5 mm square shape, made of SUS 301, was adhered with an epoxy-type resin onto the side opposite to a circuit plane of an IC-chip of 25 .mu.m thick and 3.times.3 mm square, and a winding-wire type antenna was formed to be connected to a bump formed on an IC-chip. Successively, an IC module was sandwiched from both sides by non-woven sheets made of polyethylene terephthalate fiber to prepare IC module 2. When the maximum degree between a plane, connecting the upper edge of an IC-chip plane and the upper edge of a reinforcement plate plane, and a reinforcement plate plane was .theta., tan .theta. was 0.03.

IC module 3;

The first reinforcement plate having a thickness of 120 .mu.m and 4.times.4 mm square shape, made of SUS 301, was adhered with an epoxy-type resin onto the side opposite to a circuit plane of an IC-chip of 120 .mu.m thick and 3.times.3 mm square, and a winding-wire type antenna was formed to be connected to a bump formed on an IC-chip. Successively, an IC module was sandwiched from both sides by non-woven sheets made of polyethylene terephthalate fiber to prepare IC module 3. When the maximum degree between a plane, connecting the upper edge of an IC-chip plane and the upper edge of a reinforcement plate plane, and a reinforcement plate plane was .theta., tan .theta. was 0.25.

Figure 9:
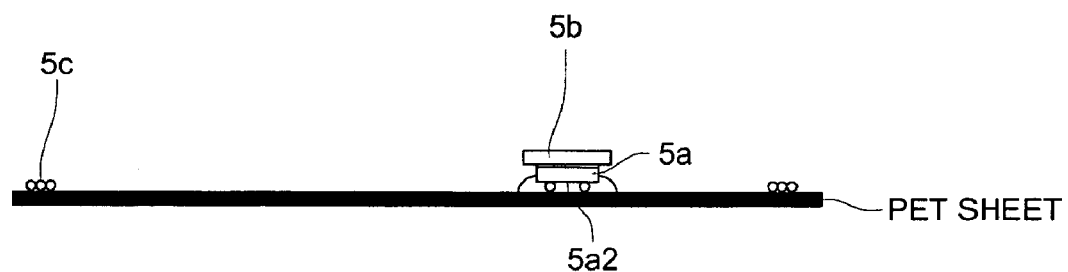
FIG. 9 shows a configuration of an another IC module.

IC module 4;

An antenna print of 5 .mu.m thick was provided on a support having a thickness of 38 .mu.m on which an antenna pattern had been formed by etching, an IC-chip of 60 .mu.m thick and 3.times.3 mm square being connected with an electric conductive adhesive of 20 .mu.m thick, and the first reinforcement plate having a thickness of 120 .mu.m and 4.times.4 mm square shape, made of SUS 301, was adhered with an epoxy-type resin so as to make the thickness of 10 .mu.m onto the side opposite to a circuit to prepare IC module 4. When the maximum degree between a plane, connecting the upper edge of an IC-chip plane and the upper edge of a reinforcement plate plate plane, and a reinforcement plane was .theta., tan .theta. was 0.14. The IC module is shown in FIG. 9.

Example 1

<Preparation of IC Card>

Figure 10:
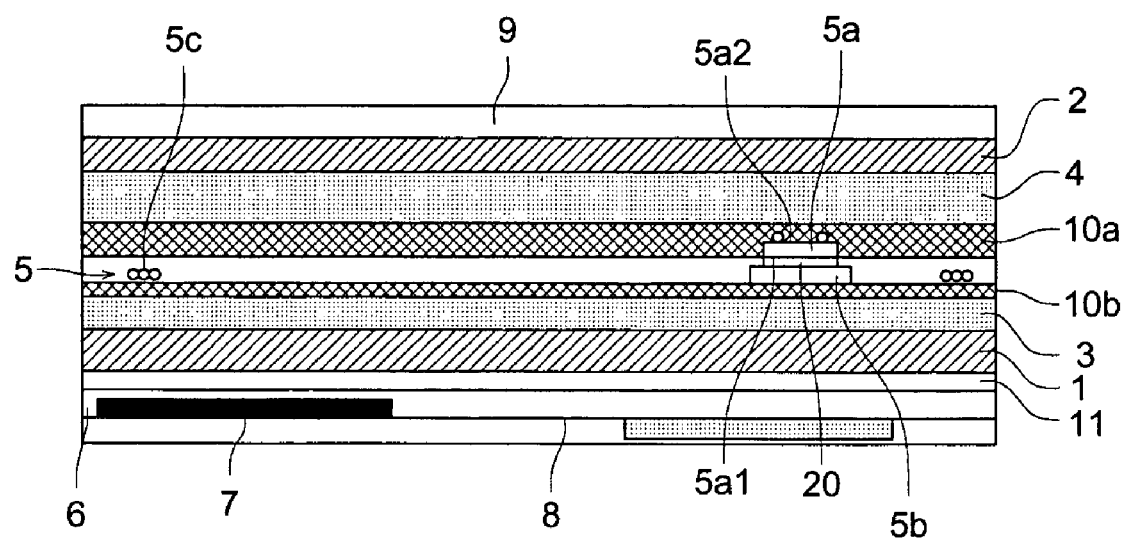
FIG. 10 shows an exemplary accumulated layer configuration of a personal certification card.

FIG. 10 shows an example of an accumulated constitution of an IC card or a personal certification card of the invention.

Support S.sub.1;

As the first support of the front-side and the second support of the backside, white polyester sheets of 125 .mu.m thick were utilized.

Support S.sub.2;

As the first support of the front-side and the second support of the backside, white polyester sheets of 188 .mu.m thick were utilized.

<Preparation of Front-Side First Support>
<Support $S_1$>

The first image receiving layer coating solution, the second image receiving layer coating solution and the third image receiving layer coating solution of the following compositions were coated and dried in this order on the surface of a 125 .mu.m thick support having been subjected to a corona discharge treatment, so as to accumulate each thickness of 0.2 .mu.m, 2.5 .mu.m and 0.5 .mu.m to prepare an image receiving layer.

1<First Image Receiving Layer Coating Solution> Polyvinyl butylal resin (Eslec BL-1, manufactured by 9 parts Sekisui Chemical Co., Ltd.) Isocyanate (Coronate HX, manufactured by Nippon 1 part Polyurethane Kogyo Co., Ltd.) Methyl ethyl ketone 80 parts Butyl acetate 10 parts<Second Image Receiving Layer Coating Solution> Polyvinyl butyral resin (Eslec BX-1, manufactured by 6 parts Sekisui Chemical Co., Ltd.) Metal ion containing compound (Compound MS) 4 part Methyl ethyl ketone 80 parts Butyl acetate 10 parts <Third Image Receiving Layer Coating Solution> Polyethylene wax (Hitech E1000, manufactured by Toho 2 parts Chemical Industry Co., Ltd.) Urethane modified ethylene acrylic acid copolymer 8 parts (Hitech S6254, manufactured by Toho Chemical Industry Co., Ltd.) Methyl cellulose (SM15, manufactured by Shin-Etsu 0.1 part Chemical Co., Ltd.) Water 90 parts <Format Printing>

A logogram and OP varnish were printed successively by a resin letterpress method.

<Preparation of Backside Second Support>
<Preparation of Writing Layer>

The first writing layer coating solution, the second writing layer coating solution and the third writing layer coating solution of the following compositions were coated and dried in this order on the surface of a 125 .mu.m thick support having been subjected to a corona discharge treatment, so as to accumulate each thickness of 5 .mu.m, 15 .mu.m and 0.2 .mu.m to prepare a writing layer.

2<First Writing Layer Coating Solution> Polyester resin (Vilon 200, manufactured by 8 parts Toyobo Co., Ltd.) Isocyanate (Coronate HX, manufactured by Nippon 1 part Polyurethane Kogyo Co., Ltd.) Carbon black a slight amount Titanium dioxide particles (CR80, manufactured by 1 part Ishihara Sangyo Kaisha Ltd.) Methyl ethyl ketone 80 parts Butyl acetate 10 parts <Second Writing Layer Coating Solution> Polyester resin (Vilonal MD1200, manufactured by 4 parts Toyobo Co., Ltd.) Silica 5 parts Titanium dioxide particles (CR80, manufactured by 1 part Ishihara Sangyo Kaisha Ltd.) Water 90 parts <Third Writing Layer Coating Solution> Polyamide resin (Sanmide 55, manufactured by 5 parts Sanwa Chemical Ind. Co., Ltd.) Methanol 95 parts A center line mean roughness of the writing layer obtained was 1.34 .mu.m.

<Preparation of Sheet for IC Card>

Figure 11:
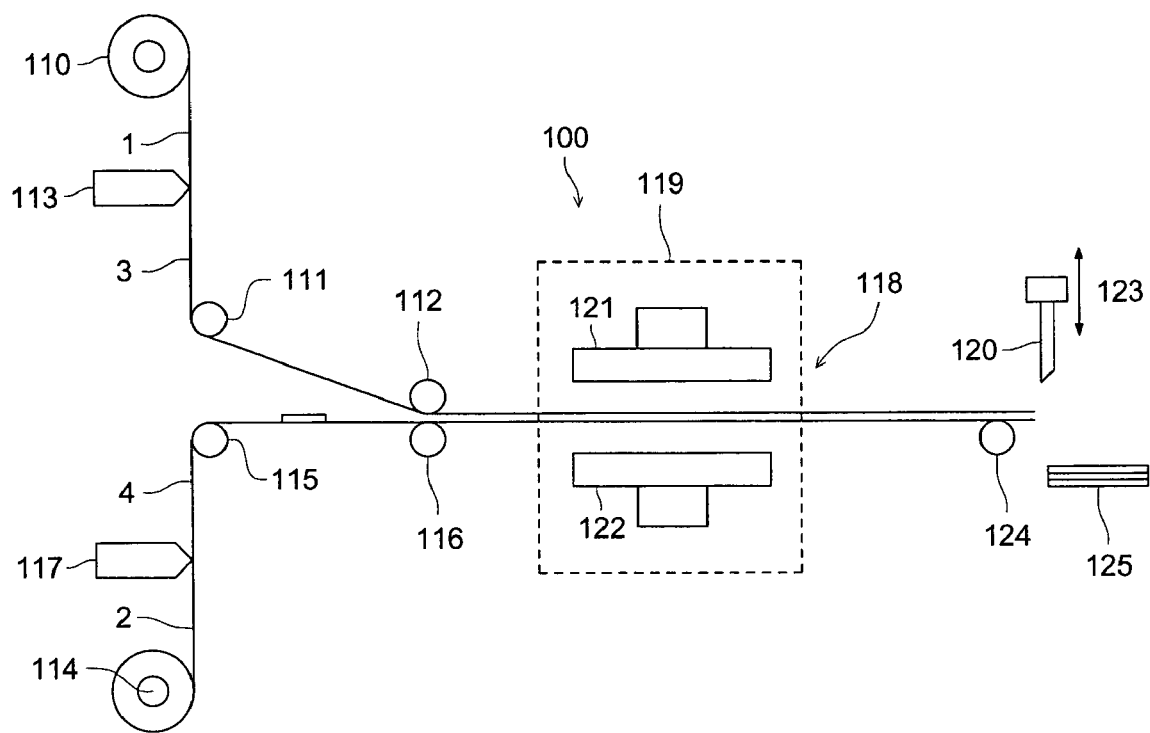
FIG. 11 shows a card producing apparatus.

FIG. 11 shows an example of a producing apparatus of an IC card according to the invention.

IC card producing apparatus 100 is equipped with a sending-out axis 110 which sends out first support 1, and first support 1 being sent out from sending-out axis 110 is fed being hanged through guide roller 111 and drive roller 112. Applicator coater 113 is arranged between sending-out axis 110 and guide roller 111. Applicator coater 113 coats adhesive 3 on a sheet at a predetermined thickness.

Further, IC card producing apparatus 100 is equipped with sending-out axis 114 which sends out second support 2, and the second support 2 being sent out from sending-out axis 114 is fed being hanged through guide roller 115 and drive roller 116. Applicator coater 117 is arranged between sending-out axis 114 and guide roller 115. Applicator coater 117 coats adhesive 4 on a sheet at a predetermined thickness.

First support 1 and second support 2, on which an adhesive having been coated, are brought in contact to be transported along transporting passage 118 from the state of opposing to each other while being separated. IC module 5 is inserted at the position where first support 1 and second support 2 are opposing to each other while being separated. IC module 5 is fed as a unit, or as plural units in a sheet-form or a roll-form. In transport passage 118 of IC card producing apparatus 100, heat laminator section 119 and cutting section 120 are arranged along a transport direction of first support 1 and second support 2. A heat laminator is preferably a vacuum heat laminator. Further, protective film supply sections may be provided before heat laminator section 119 and are preferably arranged over and under transport passage 118 opposing to each other. Heat laminator section 119 is constituted of flat heat laminator over-type 121 and heat laminator under-type 122 arranged over and under transport passage 118 opposing to each other. Heat laminator over-type 121 and heat laminator under-type 122 are set to be shiftable in a direction of contacting with and separating from each other. A sheet material is cut into a prescribed size after passing through heat laminator section 119.

<Preparation of Sheet 1 for IC Card>

A card producing apparatus of FIG. 11 was utilized and the second support for the backside and the first support for the front-side having an image receiving layer are utilized as the first support and the second support. Adhesive 1 was coated on the front-side first support having an image receiving layer by use of T dies so as to make a thickness of 80 .mu.m; adhesive 1 was coated on the backside second support by use of T dies so as to make a thickness of 380 .mu.m; IC module 1 of a configuration shown in FIG. 8 was mounted on the front-side first support having the adhesive so as to the circuit plane was on the support side of the backside second support; and then the resulting configuration, being sandwiched by upper and lower sheets, was laminated at 70.degree. C. for 1 minute to prepare sheet 1 for an IC card.

Thickness of a sheet for an IC card thus prepared was 760 .mu.m. After having been prepared, it was stored for 7 days under an environment of 25.degree. C. and 50% RH. As shown in FIG. 3, thickness D1 of an adhesive between a reinforcement plate and a support was 70 .mu.m, and a ratio thereof to maximum length T1 of a reinforcement plate as a reinforcement structure (D1/T1) was 0.012. Thickness D2 of an adhesive between an IC-chip and a support was 210 .mu.m, and a ratio thereof to maximum length T1 of a reinforcement plate as a reinforcement structure (D2/T1) was 0.037.

<Stamping>

A sheet for an IC card thus prepared was subjected to a stamping process by use of the following IC card stamping dies apparatus.

Figure 13:
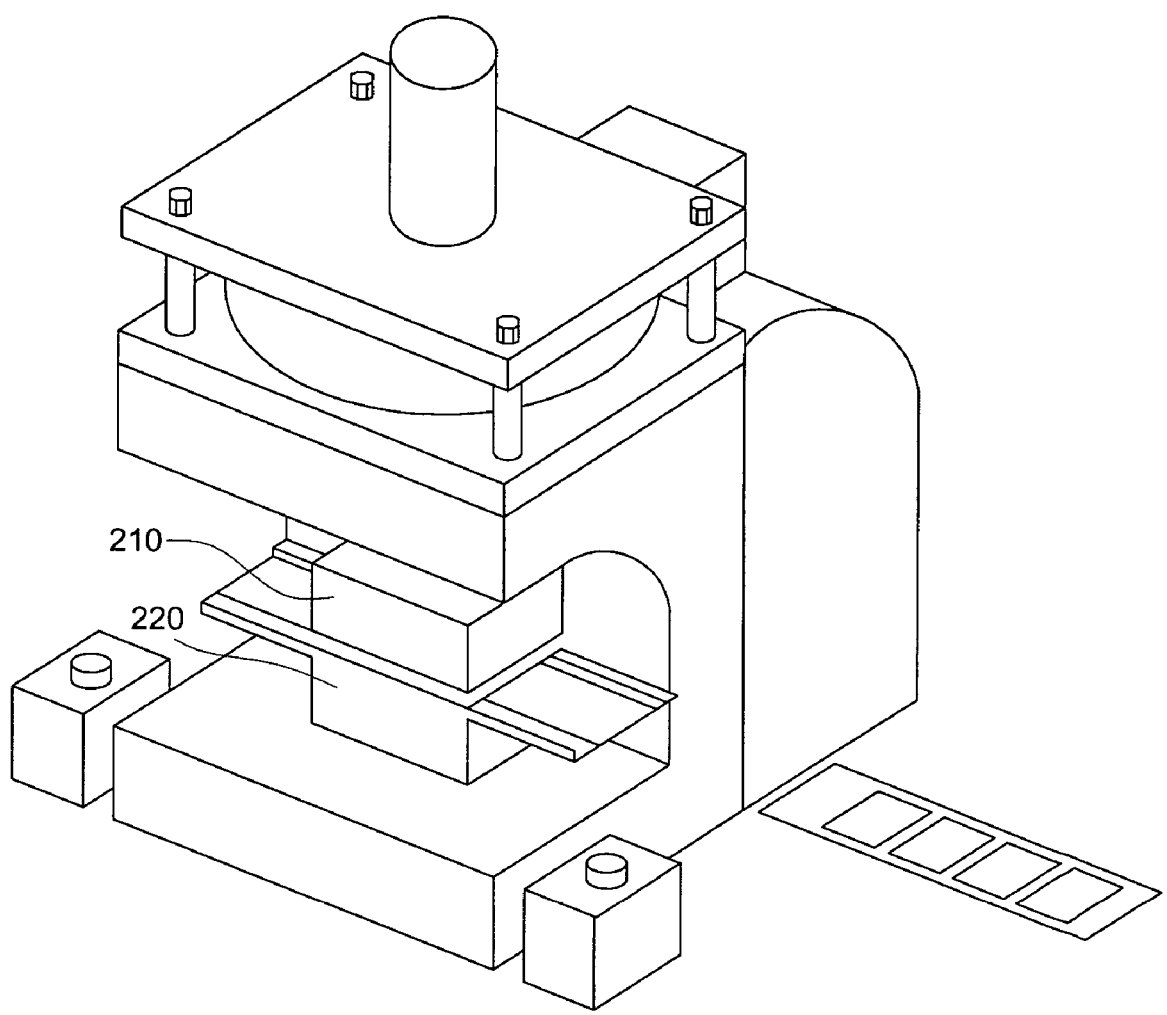
FIG. 13 shows a schematic total oblique view of a stamping dies apparatus.
Figure 14:
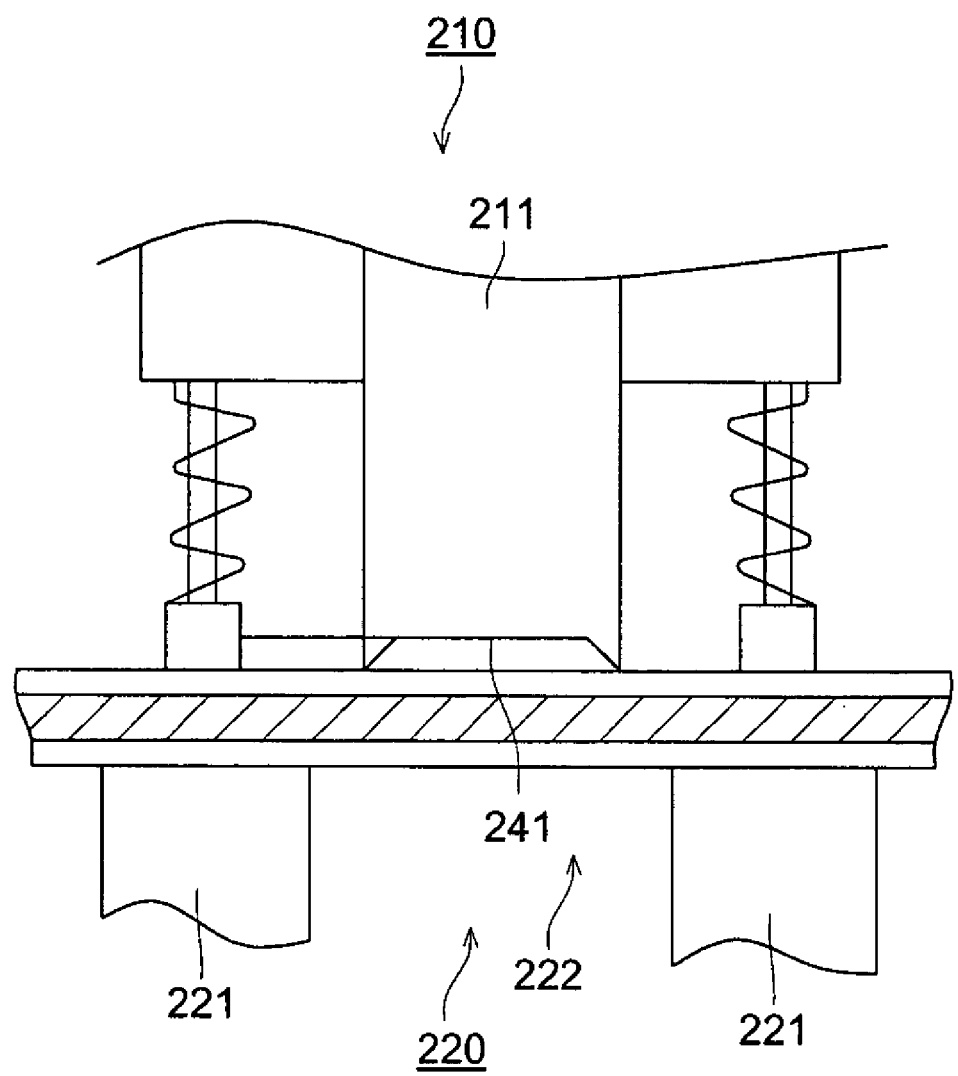
FIG. 14 shows a front end view of a main portion of a stamping apparatus.

FIG. 13 is a brief oblique view of a whole stamping dies apparatus and FIG. 14 is a front-end view of a main portion of a stamping dies apparatus.

The stamping dies apparatus provided with a stamping dies having upper blade 210 and under blade 220. Herein, upper blade 210 includes stamping punch 211 provided with escape 241 at the inside of an outer edge and under blade 220 has stamping dies 221. An IC card having the same size as that of dies hole 222 is stamped by descending stamping punch 211 into dies hole 222 provided at the center of stamping dies 221. Further, for this purpose, the size of stamping punch 211 is slightly smaller than the size of dies hole 222.

<Personal Information Recording Method on Personal Certification Card and Surface Protection Method>

A face image, attribute information and a format printing were provided according to the following manner on the above-described IC card having been subjected to a stamping process to prepare a personal certification card.

<Preparation of Ink Sheet for Sublimation Thermal Transfer Recording>

Ink sheets of three colors of yellow, magenta and cyan were obtained by providing a yellow ink layer coating solution, a magenta ink layer coating solution and a cyan ink layer coating solution of the following compositions on a polyethylene terephthalate sheet of 6 .mu.m thick, of which the backside had been subjected to anti-melt-adhesion treatment, so as to make each thickness of 1 .mu.m.

3<Yellow Ink Layer Coating Solution> Yellow dye (Compound Y-1) 3 parts Polyvinylacetal 5.5 parts (Product of Denki Kagaku Kogyo K. K.: Denkabutyral KY-24) Polymethyl methacrylate modified polystyrene 1 part (Product of Toagosei Co., Ltd.: Lededa GP-200) Urethane modified silicone oil 0.5 parts (Product of Dainichiseika Colour & Chemicals Mfg. Co., Ltd.: Daiaromer SP-2105) Methyl ethyl ketone 70 parts Toluene 20 parts <Magenta Ink Layer Coating Solution> Magenta dye (Compound M-1) 2 parts Polyvinylacetal 5.5 parts (Product of Denki Kagaku Kogyo K. K.: Denkabutyral KY-24) Polymethyl methacrylate modified polystyrene 2 parts (Product of Toagosei Co., Ltd.: Lededa GP-200) Urethane modified silicone oil 0.5 parts (Product of Dainichiseika Colour & Chemicals Mfg. Co., Ltd.: Daiaromer SP-2105) Methyl ethyl ketone 70 parts Toluene 20 parts <Cyan Ink Layer Coating Solution> Cyan dye (Compound C-1) 1.5 parts Cyan dye (Compound C-2) 1.5 parts Polyvinylacetal 5.6 parts (Product of Denki Kagaku Kogyo K. K.: Denkabutyral KY-24) Polymethyl methacrylate modified polystyrene 1 part (Product of Toagosei Co., Ltd.: Lededa GP-200) Urethane modified silicone oil 0.5 parts (Product of Dainichiseika Colour & Chemicals Mfg. Co., Ltd.: Daiaromer SP-2105) Methyl ethyl ketone 70 parts Toluene 20 parts <Preparation of Ink Sheets for Fusion Thermal Transfer Recording>

An ink sheet was obtained by coating and drying an ink layer coating solutions of the following compositions so as to make a thickness of 2 .mu.m on a polyethylene terephthalate sheet of 6 .mu.m thick, of which the backside had been subjected to anti-melt-adhesion treatment.

4<Ink Layer Coating Solution> Carnauba wax 1 part Ethylene vinylacetate copolymer 1 part (Product of Mitsui Dupont Chemicals Co.: EV40Y) Carbon black 3 parts Phenol resin 5 parts (Product of Arakawa Chemical Industries Co., Ltd.: Tamanol 521) Methyl ethyl ketone 90 parts <Formation of Face Image>

A personal image having tone was formed on an image receiving layer by overlapping an image receiving layer and an ink-side of an ink sheet for sublimation thermal transfer recording, and heating from the ink sheet side by use of a thermal head under conditions of an output power of 0.23 W/dot, a pulse width of from 0.3 to 4.5 m.multidot.sec and a dot density of 16 dot/mm. In the image, dyes described above and nickel in the image receiving layer formed complexes.

<Formation of Letter Information>

Letter information was formed on OP vanish by overlapping an OP vanish portion and an ink side of an ink sheet for fusion-type thermal transfer recording and heating from the ink sheet side by use of a thermal head under conditions of an output power of 0.5 W/dot, a pulse width of 1.0 m.multidot.sec and a dot density of 16 dot/mm.

<Surface Protecting Method>

<Preparation Method of Surface Protective Layer>

<Preparation of Actinic-Ray Curable Transfer Foil 1>

The following compositions were accumulated on a peeling layer of polyethylene terephthalate film 2 of 25 .mu.m thick, on which a peeling layer comprised of a fluorine resin layer of 0.1 .mu.m had been provided, to prepare actinic-ray curable transfer foil 1.

5<Actinic-ray Curable Compound> Product of Shin-Nakamura Kagaku Co., Ltd.: A-9300/ 11.75 parts Product of Shin-Nakamura Kagaku Co., Ltd.: EA-1020=35/Reaction initiator: Irgacure 184, manufactured 5 parts by Ciba Geigie Co. Additive: Unsaturated group containing resin 48 parts Other additive: Surfactant F-179, manufactured by 0.25 parts Dainippon Ink & Cemicals Inc. <Intermediate Layer Coating Solution> layer thickness: 1.0 .mu.m Polyvinyl butyral resin (Product of Sekisui Chemicals 3.5 parts Co., Ltd., Eslec BX-1) Taftex M-1913 (Asahi Chemical Co., Ltd.) 5 parts Hardener: Polyisocyanate (Coronate HX, manufactured by 1.5 parets Nippon Polyurethane Co., Ltd.) Methyl ethyl ketone 90 parts Curing after coating of a hardener was performed at 50.degree. C. for 24 hours.

6<Adhesive Layer Coating Solution> layer thickness: 0.5 .mu.m Urethane modified ethylene-ethylacrylate copolymer 8 parts (Product of Toho Kagaku Industry Co., Ltd.: Hitech S6254B) Polyacrylic acid ester copolymer (Product of Nippon Junyaku 2 parts Co., Ltd.: Julimer AT510) Water 45 parts Ethanol 45 parts Further, a protective layer was transferred on the above-described image receiving layer on which images and letters were recorded, by utilizing actinic-ray curable transfer foil 1 comprised of the foregoing composition and by use of a heat roller of 5 cm diameter having a rubber hardness of 85 and being heated at a surface temperature of 200.degree. C., at a pressure of 150 kg/cm.sup.2 for 1.2 sec.

Figure 15:
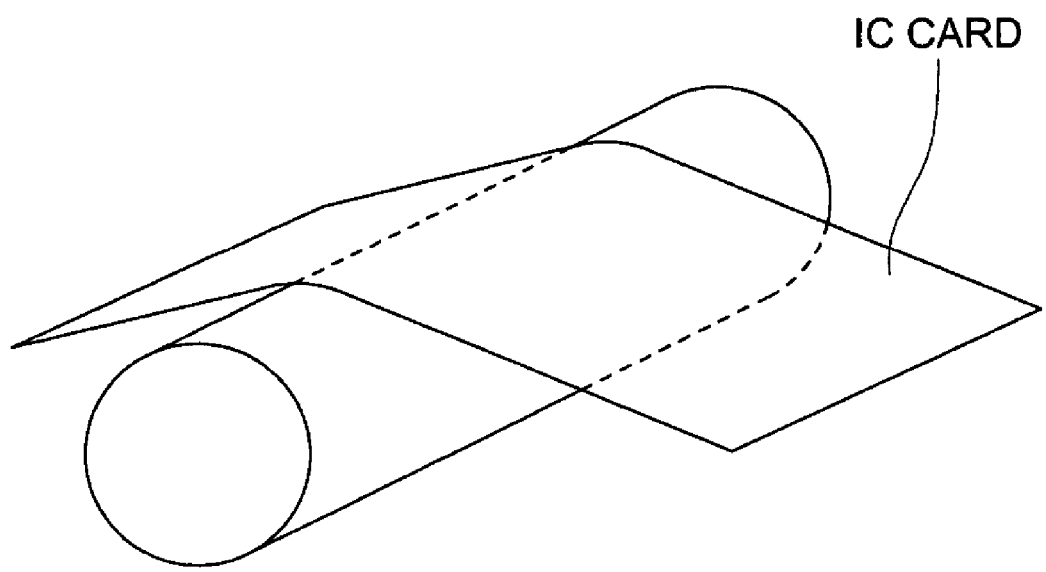
FIG. 15 shows a drawing showing a curve of an IC card.

The IC card prepared, with respect to both of the front-side and the backside, was each fixed by being firmly wound around a cylinder in a longer side direction at R=25 mm, as shown in FIGS. 3, 5 and 15, and it was confirmed that an IC operated after 24 hours. An IC operated normally without deformation after repeated bending test of 100 times.

Repeated Bending Test; While cramping on a chip, repeated bending of 100 times was performed by use of a bending tester according to JIS K at an amplitude of 50 mm, a space of 30 mm and 120 times/min.

A load of 1 kg with a rigid ball having a top edge radius R=1 mm was applied 10 times each on a circuit surface and on a non-circuit surface of an IC-chip on a rubber sheet having a hardness of 50, to show no destruction. An IC card prepared was wound around a cylinder having a radius of curvature of 25 mm and was fixed and cut as it is to observe a cross section of cutting surface through an image analyzing apparatus, and radiuses of curvature shown in FIG. 2 were as follows: at the inside of a bent card, R1=25 mm; at the outermost layer of a card, R1'=26 mm; at a reinforcement structure, R2=31 mm; and at an IC-chip, R3=32.5 mm.

Example 2

An IC card was produced in a similar manner to example 1, except that sheet 2 for an IC card was prepared as follows and that "Support $S_2$" was utilized as the front-side and backside supports.

<Preparation of Sheet 2 for IC Card>

A card producing apparatus of FIG. 11 was utilized and the above-described backside support and the front-side support having an image receiving layer, which are prepared by use of "support $S_2$", are utilized as the first support and the second support.

Figure 12:
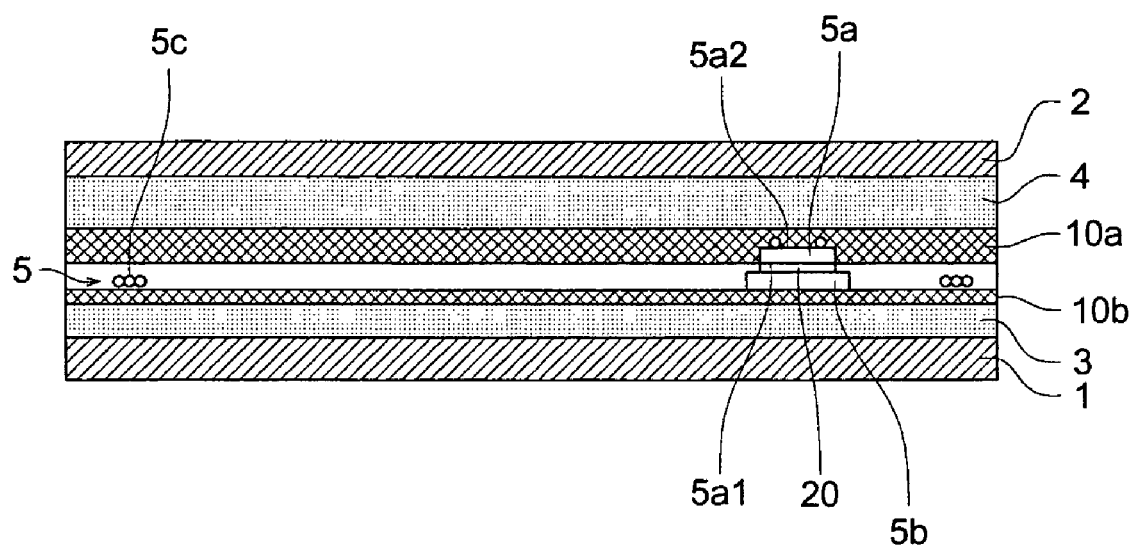
FIG. 12 shows a schematic layer configuration of an IC card.

Adhesive 1 was coated on the front-side first support having an image receiving layer by use of T dies so as to make a thickness of 34 .mu.m; adhesive 1 was coated on the backside second support by use of T dies so as to make a thickness of 300 .mu.m; IC module 1 of a configuration shown in FIG. 8 was mounted on the front-side first support having the adhesive so as to the circuit plane was on the backside second support side as shown in FIG. 12; and then the resulting configuration, being sandwiched by upper and lower sheets, was laminated at 70.degree. C. for 1 minute to prepare sheet 2 for an IC card.

Thickness of a sheet for an IC card thus prepared was 760 .mu.m. After having been prepared, it was stored for 7 days under an environment of 25.degree. C. and 50% RH. As shown in FIG. 3, thickness D1 of an adhesive between a reinforcement plate and a support was 30 .mu.m, and a ratio thereof to maximum length T1 of a reinforcement plate as a reinforcement structure (D1/T1) was 0.005.

Thickness D2 of an adhesive between an IC-chip and a support was 121 .mu.m, and a ratio thereof to maximum length T1 of a reinforcement plate as a reinforcement structure (D2/T1) was 0.022.

The IC card prepared, with respect to both of the front-side and the backside, was each fixed by being firmly wound around a cylinder in a longer side direction at R=25 mm, and it was confirmed that an IC operated after 24 hours. An IC operated normally without deformation after repeated bending test of 100 times. A load of 1 kg with a rigid ball having a top edge radius R=1 mm was applied 10 times on each of a circuit surface and a non-circuit surface of an IC-chip on a rubber sheet having a hardness of 50, to show no destruction. An IC card prepared was wound around a cylinder having a radius of curvature of 25 mm and was fixed with resin and cut as it is to observe a cross section of cut surface through an image analyzing apparatus, and radiuses of curvature R were as follows: at the inside of a bent card, R1=25 mm; at the outermost layer of a card; R1'=25.9 mm; at a reinforcement plate, R2=29 mm; and at an IC-chip, R3=30.5 mm.

Example 3

An IC card was produced in a similar manner to example 2, except that IC module 2 was utilized as an IC module. Thickness D1 of an adhesive between a reinforcement plate and a support was 30 .mu.m, and a ratio thereof to maximum length T1 of a reinforcement plate as a reinforcement structure (D1/T1) was 0.004. Thickness D2 of an adhesive between an IC-chip and a support was 149 .mu.m, and a ratio thereof to maximum length T1 of a reinforcement plate as a reinforcement structure (D2/T1) was 0.021.

The IC card prepared, with respect to both of the surface-side and the backside, was each fixed by being firmly wound around a cylinder in a longer side direction at R=25 mm, and it was confirmed that an IC operated after 24 hours. An IC operated normally without deformation after repeated bending test of 100 times. A load of 1 kg with a rigid ball having a top edge radius R=1 mm was applied 10 times on each of a circuit surface and a non-circuit surface of an IC-chip on a rubber sheet having a hardness of 50, to show no destruction. An IC card prepared was wound around a cylinder having a radius of curvature of 25 mm and was fixed with resin and cut as it is to observe a cross section of cut surface through an image analyzing apparatus, and radiuses of curvature R were as follows: at the inside of a bent card, R1=25 mm; at the outermost layer of a card, R1'=25.9 mm; at a reinforcement plate, R2=29 mm; and at an IC-chip, R3=30.5 mm.

Example 4

An IC card was produced in a similar manner to example 1, except that sheet 3 for an IC card is prepared as follows by use of "Support $S_2$" as the front-side and backside supports and that IC module 4 was utilized as an IC module.

<Preparation of Sheet 3 for IC Card>

A card producing apparatus of FIG. 11 was utilized and the above-described backside second support and the front-side first support having an image receiving layer, which are prepared by use of "support $S_2$", are utilized as the first support and the second support. Adhesive 1 was coated on the front-side first support having an image receiving layer by use of T dies so as to make a thickness of 30 .mu.m; adhesive 1 was coated on the backside second support by use of T dies so as to make a thickness of 266 .mu.m; IC module 1 of a configuration shown in FIG. 8 was mounted on the front-side first support having the adhesive so as to the circuit plane was on the front-side support side as shown in FIG. 6; and then the resulting configuration, being sandwiched by upper and lower sheets, was laminated at 70.degree. C. for 1 minute to prepare sheet 3 for an IC card. Thickness of a sheet for an IC card thus prepared was 760 .mu.m. After preparation, the card was stored under an environment of 25.degree. C. and 50% RH for 7 days.

Thickness D1 of an adhesive between a reinforcement plate and a support was 51 .mu.m, and a ratio thereof to maximum length T1 of a reinforcement plate as a reinforcement structure (D1/T1) was 0.009, as shown in FIG. 7. Thickness D2 of an adhesive between an IC-chip and a support was 30 .mu.m, and a ratio thereof to maximum length T1 of a reinforcement plate as a reinforcement structure (D2/T1) was 0.009.

The IC card prepared, with respect to both of the front-side and the backside, was each fixed by being firmly wound around a cylinder in a longer side direction at R=25 mm, and it was confirmed that an IC operated after 24 hours. An IC operated normally without deformation after repeated bending test of 100 times. A load of 1 kg with a rigid ball having a top edge radius R=1 mm was applied 10 times on each of a circuit surface and a non-circuit surface of an IC-chip on a rubber sheet having a hardness of 50, to show no destruction.

An IC card prepared was wound around a cylinder having a radius of curvature of 25 mm and was fixed with resin and cut as it is to observe a cross section of cut surface through an image analyzing apparatus, and radiuses of curvature R were as follows: at the inside of a bent card, R1=25 mm; at the outermost layer of a card, R1'=25.9 mm; at a reinforcement plate, R2=28.5 mm; and at an IC-chip, R3=29 mm.

Example 5

An IC card was produced in a similar manner to example 2, except that IC module 3 was utilized as an IC module. Thickness D1 of an adhesive between a reinforcement plate and a support was 30 .mu.m, and a ratio thereof to maximum length T1 of a reinforcement plate as a reinforcement structure (D1/T1) was 0.004. Thickness D2 of an adhesive between an IC-chip and a support was 54 .mu.m, and a ratio (D2/T1) was 0.01.

The IC card prepared, with respect to both of the surface-side and the backside, was each fixed by being firmly wound around a cylinder in a longer side direction at R=25 mm, and it was confirmed that an IC operated after 24 hours. An IC operated normally without deformation after repeated bending test of 100 times. A load of 1 kg with a rigid ball having a top edge radius R=1 mm was applied 10 times on each of a circuit surface and a non-circuit surface of an IC-chip on a rubber sheet having a hardness of 50, to show destruction at 8 times.

An IC card prepared was wound around a cylinder having a radius of curvature of 25 mm and was fixed with resin and cut as it is to observe a cross section of cut surface through an image analyzing apparatus, and radiuses of curvature R were as follows: at the inside of a bent card, R1=25 mm; at the outermost layer of a card, R1'=25.9 mm; at a reinforcement plate, R2=29 mm; and at an IC-chip, R3=29 mm.

Comparative Example

An IC card was produced in a similar manner to example 5, except that Alon-alpha GEL-10 (a 2% modulus of elasticity of 60 kg/mm.sup.2, ductility at a breaking point of 5%, manufactured by Toagose Co., Ltd.) was utilized as an adhesive and lamination at 23.degree. C. was performed immediately after coating of an adhesive. The IC card prepared, with respect to both of the front-side and the backside, was each fixed by being firmly wound around a cylinder in a longer side direction at R=25 mm, and it was confirmed that an IC did not operate after 24 hours. There were observed break of a card and no operation of an IC after repeated bending test of 100 times. A load of 1 kg with a rigid ball having a top edge radius R=1 mm was applied on each of a circuit surface and a non-circuit surface of an IC-chip on a rubber sheet having a hardness of 50, to show destruction at 1 time.

An IC card prepared was wound around a cylinder having a radius of curvature of 25 mm and was fixed with resin and cut as it is to observe a cross section of cut surface through an image analyzing apparatus, and radiuses of curvature R were as follows: at the inside of a bent card, R1=25 mm; at the outermost layer of a card, R1'=25.8 mm; at a reinforcement plate, R2=25.5 mm; and at an IC-chip, R3=25.7 mm.

According to the invention described in item 1, it is possible to improve bending strength of an IC card and to protect an IC-chip, by defining a radius of curvature of each of an outermost layer of a card, a reinforcement structure and an IC-chip.

According to the invention described in item 2, it is possible to improve bending strength of an IC card and to protect an IC-chip, by defining a relation between a thickness of an adhesive between a reinforcement structure and a front-side support and the maximum length of a reinforcement structure.

According to the invention described in item 3, it is possible to improve bending strength of an IC card and to protect an IC-chip, by making $0.02 < \tan \theta < 0.2$, wherein .theta. is a degree between a plane, connecting the upper edge of a metal reinforcement plate and the upper edge of an IC-chip plane, and a horizontal plane of the metal reinforcement plate.

According to the invention described in item 4, it is possible to improve bending strength of an IC card and to protect an IC-chip, by defining the relation between a thickness of an adhesive between an IC-chip and a front-side support and the maximum length of a reinforcement structure.

According to the invention described in item 5, it is possible to improve bending strength of an IC card and to protect an IC-chip, by defining a 2% modulus of elasticity of an adhesive adjacent to an IC-chip and a reinforcement structure, and a ductility at a breaking point.

According to the invention described in item 6, it is possible to improve bending strength of an IC card and to protect an IC-chip, by defining a thickness of an IC-chip.

According to the invention described in item 7, said IC card can be utilized as a personal certification card preferably applied in a non-contact type electronic card or sheet which has an image receiving layer and a writing layer and memorizes personal information requiring security such as prevention of forgery and alteration.

According to the invention described in item 8, it is possible to relax stress and to obtain high durability due to an adhesive being a reactive-type hot-melt adhesive.

What is claimed is:

1. An IC card, comprising:
   a first support;
   a second support;
   an IC module including an IC chip, a reinforcing structural member neighboring to the IC chip and an antenna; the IC module provided between the first and second supports;
   a first adhesive layer provided between the first support and the reinforcing structural member; and
   a second adhesive layer provided between the second support and the IC chip;
   wherein when the IC card is curved with a radius R1 of curvature, the following formula is satisfied:

$$R1 < R1' < R2 \leq R3$$

where R1' is a radius of curvature of an outermost layer of the IC card, R2 is a radius of curvature of the reinforcing structural member, and R3 is a radius of curvature of the IC chip, and
   wherein the reinforcing structural member is a metallic reinforcing plate having an upper surface on which the IC chip is mounted and an area of the upper surface of the metallic reinforcing plate is larger than an area of the IC chip, and
   wherein when θ is an angle between the upper surface of the metallic reinforcing plate and a line connecting an edge of the upper surface of the metallic reinforcing plate with an edge of an upper surface of the IC chip, the following formula is satisfied:

$$0.02 < \tan \theta < 0.2.$$

2. The IC card of claim 1, wherein when D1 is a thickness of the first adhesive layer and T1 is the maximum length of the reinforcing structural member, D1/T1 is 0.001 to 0.05.

3. The IC card of claim 2, wherein D1/T1 is 0.002 to 0.04.

4. The IC card of claim 3, wherein the following formula is satisfied:

$$0.03 < \tan \theta < 0.15.$$

5. The IC card of claim 2, wherein the following formula is satisfied:

$$0.03 < \tan\theta < 0.15.$$

6. The IC card of claim 5, wherein when D2 is a thickness of the second adhesive layer and T1 is the maximum length of the reinforcing structural member, D2/T1 is 0.001 to 0.05.

7. The IC card of claim 6, wherein D2/T1 is 0.002 to 0.04.

8. The IC card of claim 2, wherein the first and second adhesive layer is formed by a reactive-type hot-melt adhesive.

9. The IC card of claim 1, wherein the following formula is satisfied:

$$0.03 < \tan\theta < 0.15.$$

10. The IC card of claim 1, wherein when D2 is a thickness of the second adhesive layer and T1 is the maximum length of the reinforcing structural member, D2/T1 is 0.001 to 0.05.

11. The IC card of claim 10, wherein D2/T1 is 0.002 to 0.04.

12. The IC card of claim 1, wherein the first and second adhesive layers have a 2% modulus of elasticity of 5 kg/mm$^2$ to 55 kg/mm$^2$ and a ductillity at a breaking point of 200% to 1300%.

13. The IC card of claim 12, wherein the 2% modulus of elasticity is 6 kg/mm$^2$ to 50 kg/mm$^2$.

14. The IC card of claim 1, wherein the reinforcing structural member has a Young's modulus of 150 Gpa to 450 Gpa.

15. The IC card of claim 1, wherein the IC card has a thickness of 5μm to 100 μm.

16. The IC card of claim 15, wherein the reinforcing structural member has a Young's modulus of 150 Gpa to 450 Gpa.

17. The IC card of claim 16, wherein the first and second adhesive layer is formed by a reactive-type hot-melt adhesive.

18. The IC card of claim 1, wherein an image receiving layer is provided on the first support.

19. The IC card of claim 1, wherein a writable layer is provided on the second support.

20. The IC card of claim 1, wherein the first and second adhesive layer is formed by a reactive-type hot-melt adhesive.

* * * * *